(12) United States Patent
Kojima et al.

(10) Patent No.: US 10,859,769 B2
(45) Date of Patent: Dec. 8, 2020

(54) COMPACT PHOTONIC DEVICES

(71) Applicant: Mitsubishi Electric Research Laboratories, Inc., Cambridge, MA (US)

(72) Inventors: Keisuke Kojima, Weston, MA (US); Mohammad hossein Taher sima, Washington, DC (US); Toshiaki Koike-Akino, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 81 days.

(21) Appl. No.: 16/214,502

(22) Filed: Dec. 10, 2018

(65) Prior Publication Data

US 2020/0081188 A1 Mar. 12, 2020

Related U.S. Application Data

(60) Provisional application No. 62/727,588, filed on Sep. 6, 2018.

(51) Int. Cl.
*G02B 6/27* (2006.01)
*G02B 6/13* (2006.01)
(Continued)

(52) U.S. Cl.
CPC ......... *G02B 6/2773* (2013.01); *G02B 6/1225* (2013.01); *G02B 6/13* (2013.01);
(Continued)

(58) Field of Classification Search
CPC ...... G02B 6/2773; G02B 6/13; G02B 6/1225; G02B 2006/12061; G02B 2006/1215;
(Continued)

(56) References Cited

U.S. PATENT DOCUMENTS

| 4,693,546 A | 9/1987 | Lorenzo et al. |
| 5,745,618 A | 4/1998 | Li |

(Continued)

FOREIGN PATENT DOCUMENTS

| JP | 2003279763 A | 10/2003 |
| JP | 20050995929 A | 4/2005 |

OTHER PUBLICATIONS

Ting-Hang Pei et al. "The Heterostructure Photonic Crystal Waveguide Splitter," IEEE Photonics Tech Letters, Service Center, Piscataway, NJ, US, vol. 23, No. 16.2011-08-01, pp. 1041-1135.

*Primary Examiner* — John Bedtelyon
(74) *Attorney, Agent, or Firm* — Gennadiy Vinokur; James McAleenan; Hironori Tsukamoto

(57) ABSTRACT

A photonic device for splitting optical beams includes an input port configured to receive an input beam having an input power, a power splitter including perturbation segments arranged in a first region and a second region of a guide material having a first refractive index, each segment having a second refractive index, wherein the first region is configured to split the input beam into a first beam and a second beam, wherein and the second region is configured to separately guide the first and second beams, wherein the first refractive index is greater than the second refractive index, and output ports including first and second output ports connected the power splitter to respectively receive and transmit the first and second beams.

21 Claims, 11 Drawing Sheets

(51) Int. Cl.
*G02B 6/122* (2006.01)
*G02B 6/12* (2006.01)

(52) U.S. Cl.
CPC ............... *G02B 2006/1215* (2013.01); *G02B 2006/12061* (2013.01)

(58) Field of Classification Search
CPC ........ G02B 6/122; G02B 6/125; G02B 6/126; G02B 6/24; G02B 6/28; G02B 6/2804; G02B 6/2808; G02B 6/2813
See application file for complete search history.

(56) References Cited

U.S. PATENT DOCUMENTS 7,006,729 B2   2/2006  Wang et al.
7,433,562 B2 * 10/2008  Marti Sendra ......... B82Y 20/00
                                                    385/48

* cited by examiner

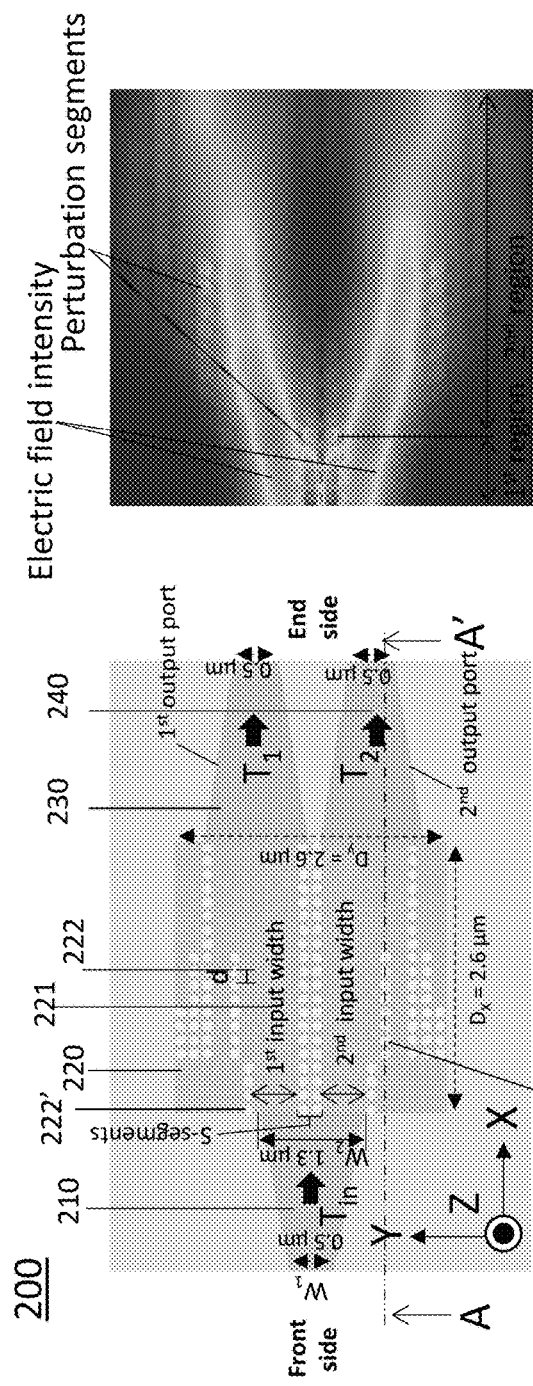
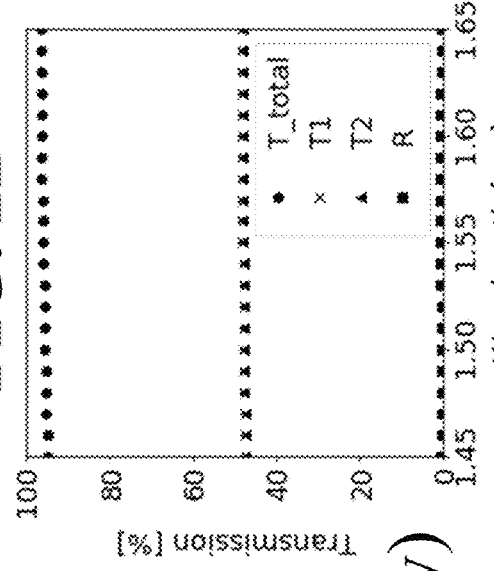
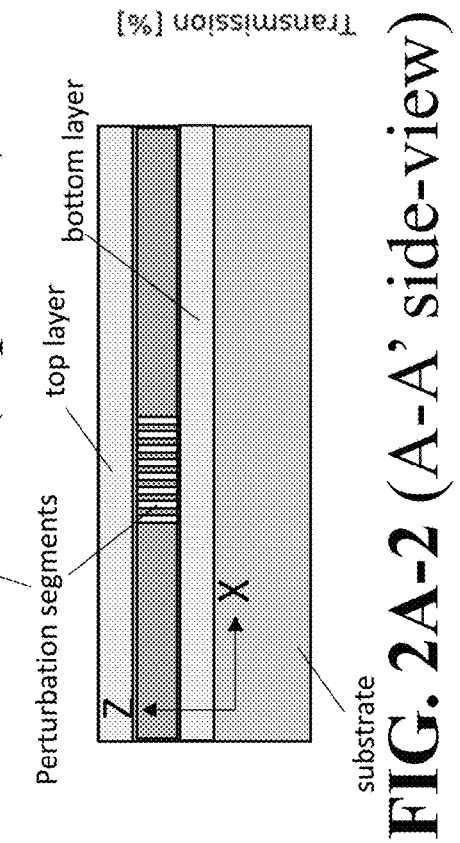
FIG. 2A-1 (top view)
FIG. 2A-2 (A-A' side-view)
FIG. 2B
FIG. 2C

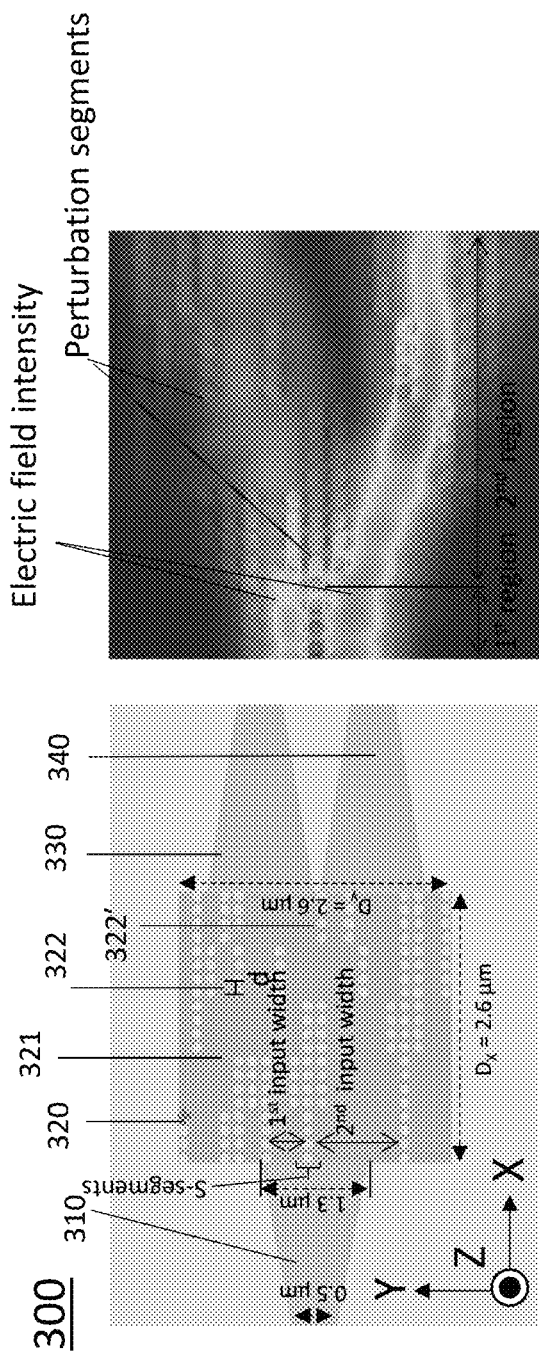
FIG. 3A
FIG. 3B
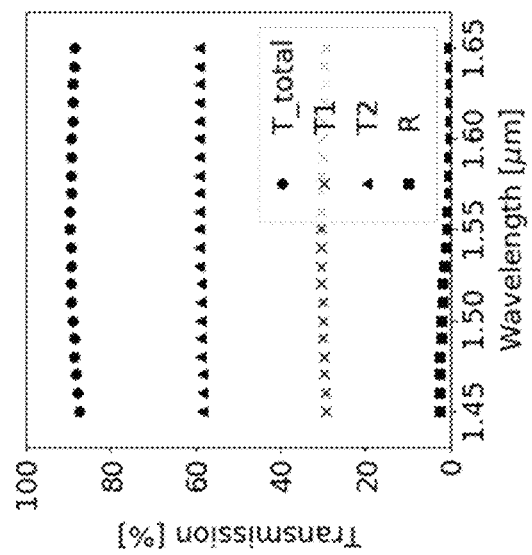
FIG. 3C

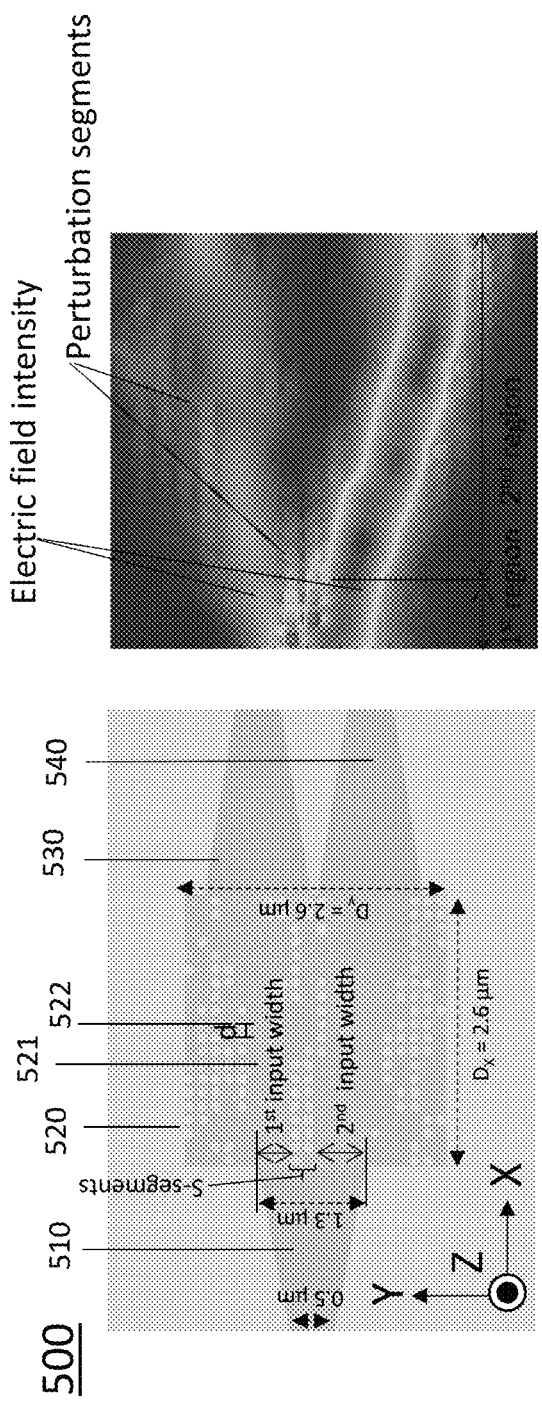
FIG. 5A
FIG. 5B
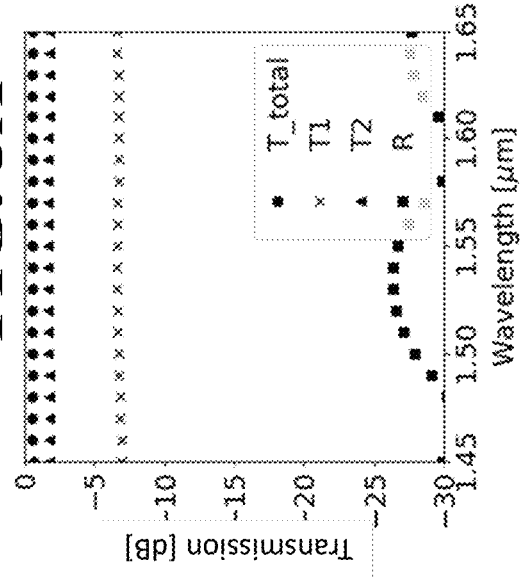
FIG. 5C

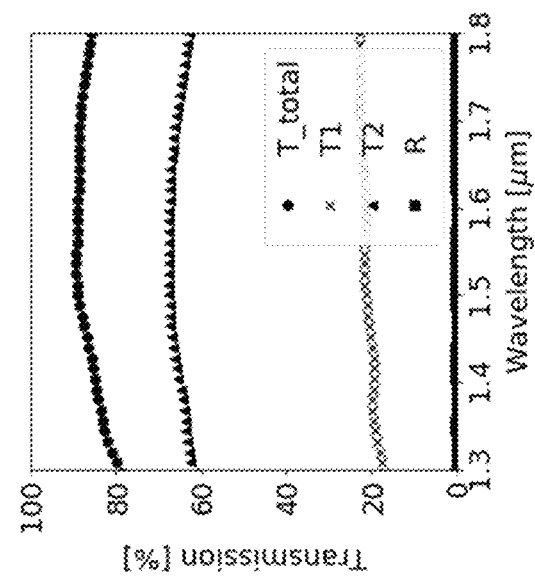
FIG. 6A
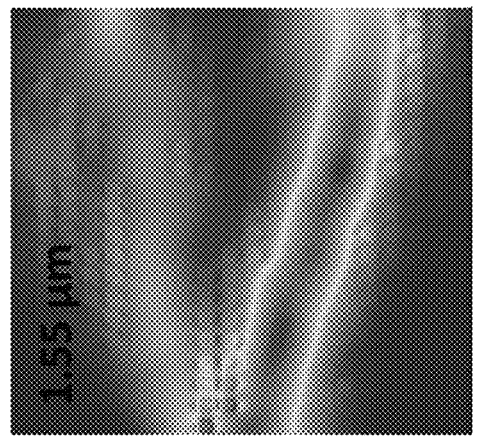
FIG. 6B
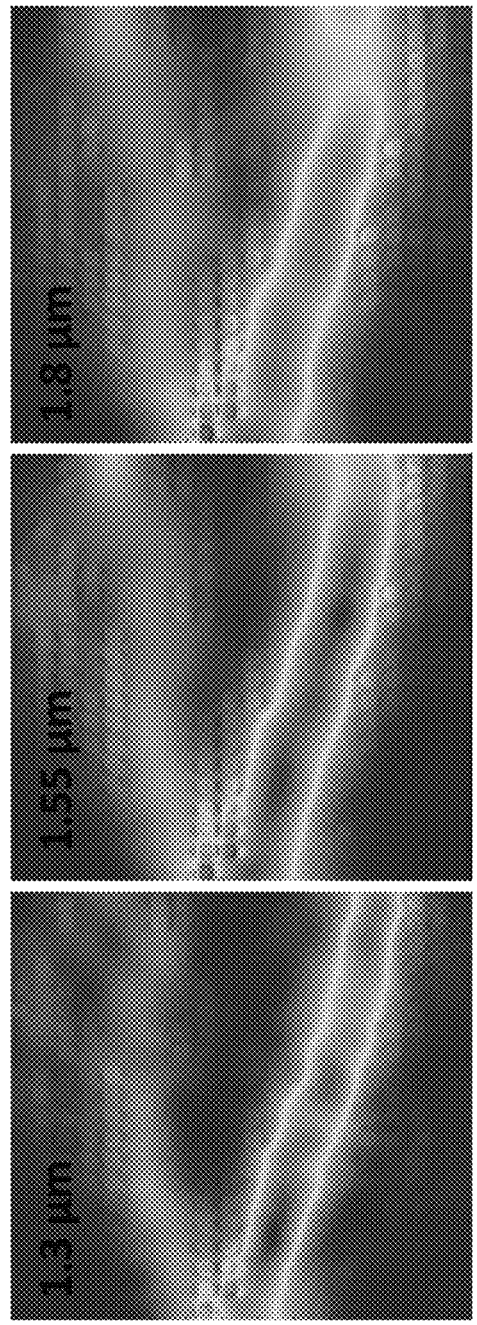
FIG. 6C(i)  FIG. 6C(ii)  FIG. 6C(iii)

1:1 power splitter

1:2 power splitter

1:3 power splitter

COMPACT PHOTONIC DEVICES

FIELD OF THE INVENTION

This invention generally relates to compact nanostructured photonic devices, and more particularly to compact photonic devices for broadband power splitters.

BACKGROUND OF THE INVENTION

On-chip arbitrary ratio power splitting has been researched over years, which splits optical beams the optical power of a single channels into two or more output waveguide with an arbitrary power ratio.

A number of power splitter devices have been developed, including Multi Mode Interferometer (MMI) based, Y shape, or nanostructured power splitters with 500 nm wide waveguides at input and ouput ports. However, the overall transmission efficencies is limited to ~80% (approximately −1 dB) with non-negligible back reflection values back to the inout port (or nearby output ports). One therotical way to reduce back reflection is to use infinitly sharp Y splitter at the intersection of two ouputs. However, the small fabrication tolerance for splitters with such extremely sharp edges, in practice, results in large back reflection to the input port.

There is a need to develop novel compact photonic devices used for power splitters that are enable to efficiently split the optical power of an optical beam into multiple output beams according to a predetermined power ratio in compact nanostructured devices while minimizing back reflection at input.

SUMMARY OF THE INVENTION

Some embodiments of the present disclosure are based on recognition that compact photonic devices based on a family of ultra-compact (~2.6 μm length) SOI power splitters can be obtained according to the design optimization by use of a machine-learning-assisted optimization method. Any splitting ratios, such as 1:1, 1:2, and 1:3 can be achieved with above 90% transmission efficiency and negligible reflection over 100 nm bandwidth. In principle, the optimization technique can be used to design arbitrary power splitters with multiple input and output. In addition, topology optimized nanostructured integrated photonic using this method can help establishing alternative functionalities, such as spectral splitting, mode conversion, and waveguide bending, within a compact footprint.

According to embodiments, it is possible to realize novel compact photonic devices used for power splitters that are enable to efficiently split the optical power of an optical beam into multiple output beams according to a predetermined power ratio in compact nanostructured devices, while minimizing back reflection at input ports to below −20 dB using nanostructured perturvation segments that are not smaller than 45 nm.

In according to some embodiments of the present disclosure, a photonic device is provided for splitting optical power to separate channels. The photonic device for splitting optical beams includes an input port configured to receive an input beam having an input power; a power splitter including perturbation segments arranged in a first region and a second region of a guide material having a first refractive index, each segment having a second refractive index, wherein the first region is configured to split the input beam into a first beam and a second beam, wherein and the second region is configured to separately guide the first and second beams, wherein the first refractive index is greater than the second refractive index; and output ports including first and second output ports connected the power splitter to respectively receive and transmit the first and second beams.

Further, some embodiments of the present invention are based on recognition that a photonic device for splitting optical beams includes an input port configured to receive an input beam having an input power; a power splitter including perturbation segments arranged in a first region and a second region of a guide material having a first refractive index, each segment having a second refractive index, wherein the first region is configured to broaden the input beam and the second region is configured to split the broaden input beam into a first beam and a second beam, wherein the first refractive index is greater than the second refractive index; and output ports including first and second output ports connected the power splitter to respectively transmit the first and second beams.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2A-1 shows a top view of a 1:1 power splitter, according to embodiments of the present disclosure;

FIG. 2A-2 shows a side view of a 1:1 power splitter, according to embodiments of the present disclosure;

FIG. 2B shows a E field distribution plot of the 1:1 power splitter of FIG. 2A-1;

FIG. 2C is an FDTD spectrum indicating the efficiency of the 1:1 power splitter of FIG. 2A-1;

FIG. 3A shows a 1:2 power splitter, according to embodiments of the present disclosure;

FIG. 3B shows a E field distribution plot of the 1:2 power splitter of FIG. 3A;

FIG. 3C is an FDTD spectrum indicating the efficiency of the 1:2 power splitter of FIG. 3A;

FIG. 5A shows a 1:3 power splitter, according to embodiments of the present disclosure;

FIG. 5B shows a E field distribution plot of the 1:3 power splitter of FIG. 5A;

FIG. 5C is an FDTD spectrum in dB units indicating the efficiency of the 1:3 power splitter of FIG. 5A;

FIG. 6A shows a 1:3 power splitter, according to embodiments of the present disclosure;

FIG. 6B shows a broadband transmission and reflection spectrum indicating the efficiency of the 1:3 power splitter of FIG. 6A in a broadband range of 1.3 to 1.8 µm;

FIG. 6C(i), FIG. 6C(ii) and FIG. 6C(iii) shows E field distribution plot of the 1:3 power splitter of FIG. 6A, at 1.3, 1.55, and 1.8 µm;

DETAILED DESCRIPTION OF THE PREFERRED EMBODIMENTS

Figure 1:
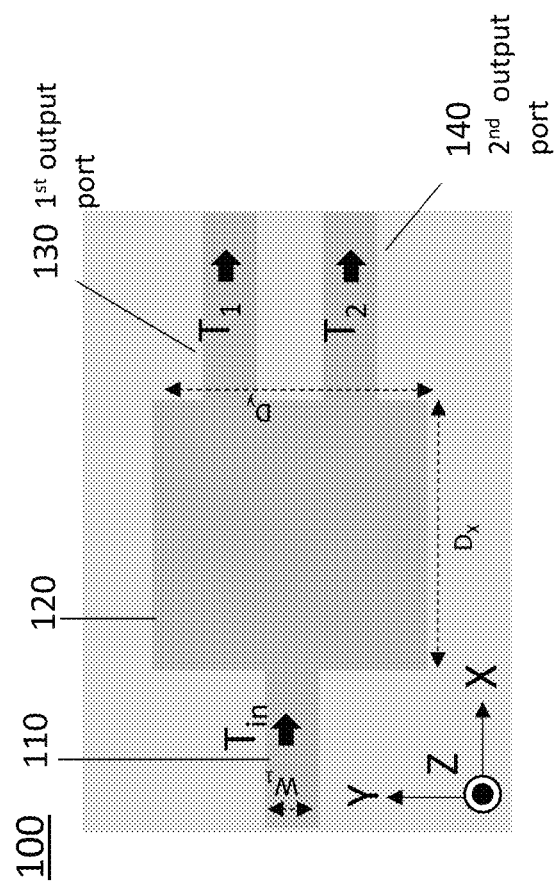
FIG. 1 shows a power splitter of a related art.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

On-chip power splitters are essential components of an integrated photonic system. The power splitters are used to divide a single beam into multiple beams with a predesigned splitting ratio. A number of power splitter devices have been developed, and Y shape, MMI based, or Quick Response (QR) code-like nanostructured power splitters show transmission efficiencies limited to 80%.

Silicon-on-insular (SOI) power splitters can be one of the candidates for such essential components of the integrated photonic system. The most intuitive power splitter is to break the symmetry of conventional multimode interference (MMI) power splitters to achieve arbitrary splitting ratio by adjusting shape of the MMI structure.

FIG. 1 shows a multi-mode interference (MMI) power splitter 100 according to a related art. For instance, the power splitter 100 can be formed on a device in the order of tens of micrometers in length. The power splitter 100 includes an input port 110, a power splitter 120 and two output ports (first output port) 130 and (second output port) 140. The first output port 130 transmits a first output beam with a first output power, and the second output port 140 transmits a second output beam with a second output power.

When the power splitter 100 is designed as a 1:1 power splitter, an input optical beam is split into two beams (first and second output beams $T_1$ and $T_2$) in the power splitter 120 and guide the two beams to the first and second output ports 130 and 140, respectively, with an optical power ratio of the first and second output beams represented by 1:1 ($T_1:T_2=1:1$). Some device geometries are indicated using symbols W1, Dx and Dy in the figure.

The working principles of the power splitter 100 based on MMI is very well studied, and achieving arbitrary splitting ratio is also possible with a broken symmetry. However, as the device size becomes small, the small change in the MMI width alters the device characteristics significantly. In addition, the principle of MMI relies on the coupling length within the device, and inherently the device characteristics is sensitive to wavelength. Therefore, achieving a very broadband MMI-based splitter is very difficult.

In order to solve the issues mentioned above, a novel design of a photinic device for efficiently spliting an optical (light) beam is still required. Accordingly, some embodiments, which provide solutions regarding the issues, will be described below based on recognition that a photonic device for splitting optical beams includes an input port configured to receive an input beam having an input power, a power splitter including perturbation segments arranged in a first region and a second region of a guide material having a first refractive index, each segment having a second refractive index, wherein the first region is configured to split the input beam into a first beam and a second beam, wherein and the second region is configured to separately guide the first and second beams, wherein the first refractive index is greater than the second refractive index; and output ports including first and second output ports connected the power splitter to respectively receive and transmit the first and second beams.

Further, it should be noted that the power splitter is formed of nanostructured segments that are arranged in the guide material to effectively guide the input optical beam along predesigned beam paths toward the output ports. In this case, the nanostructured segments can be nanometersize cylinder or any arbitrary shapes that have a refractive index being less than that of the guide material of the power splitter. In some cases, the nanostructured segments may be nanostructure-size rods with a cross-sectional shape such as oval, rectangular, square, triangle or combinations of some of them. For instance, when the guide material is silicon, the segments may be formed from silicon dioxide or even air holes. In some cases, the nanostructured segments may be referred to as perturbation segments. According to embodiments of the present invention, the refractive index of the perturbation segments is smaller than that of the guide material. For arranging the perturbation segments, the minimum distance between the segments are determined to satisfy a condition of $d<\lambda/(2n_{eff})$, where d is the minimum pitch or distance between the perturbation segments, $n_{eff}$ is a highest effective index of a waveguide mode of the guide material, and $\lambda$ is a wavelength of the input signal. Regarding a method of designing the photonic device, detail discussion will be made below.

FIG. 2A-1 shows a top view of a 1:1 power splitter 200, according to embodiments of the present disclosure. This is an example illustrating an optimized geometry for a 1:1 power splitter. The 1:1 power splitter 200 includes an input port 210, a power splitter 220 and two output ports 230 and 240, which guide an output mode with an optical power equal to 1:1 ratio of the input power. Further, the side of the input port 210 is referred to as a frond side, and the side of the output ports 230 and 240 is referred to as an end side. In the following discussion, the definition of the front and end sides are similarly applied to the power splitters or photonic devices described in the present disclosure without further explanations.

The power splitter 200 can be realized by a compact device footprint of 2.6×2.6 μm². Such a device can be optimized inside a nanostructured waveguide, giving 90% splitting transmission efficiency over 100 nm bandwidth.

The input port 210 receives a first beam (input optical beam, indicated by an arrow in the figure) having a first mode. The power splitter 220 includes split-segments (S-segments) that determines a first input width and a second input width for the input beam. The S-segments split the input optical beam into first and second beams.

The first input width allows guiding the first beam to the first output port 230 and the second input width allows guiding the second beam to the second output port 240.

In this case, the first and second input widths can be defined by a position of S-segments portion in the power splitter 220, in which the S-segments portion is arranged from the input port toward the output ports 230 and 240.

In a case where an output power ratio at the first output port and the second output port is designed to be 1:1, the first input width and the second input width in the power splitter 220 can be arranged to be approximately identical distance. In some cases, a few percent of difference between the first and second input widths can be acceptable to accumulate the manufacturing errors for practical use.

Further, for instance, when a power ratio of the first and the second output powers at the first and second output ports 230 and 240 is represented by $T_1:T_2$ and $T_1<T_2$, then the first input width guiding part of the input beam to the first output port is arranged to be less than the second input width guiding to the rest of the input beam to the second output port. In other words, when the first output power is designed to be greater than the second output power, the first input width is set to be greater than the second input width by arranging the S-segments toward the side of the second width. Further, when the first output power is designed to be less than the second output power, the first input width is set to be less than the second input width by arranging the S-segments toward the side of the first width.

Some examples are seen in FIGS. 3A, 4A, 5A, 5D and 6A.

According to some embodiments of the present invention, the functions of the first and second regions of the power splitter can be exchanged. For instance, the power splitter 220 may be configured to broaden the first beam in the first region and split the power into two at the second region of the power splitter 220. Further, the power splitter 220 direct the wave vector of separated beams, and center broadened beams to guide to the output ports of the power splitter 200, thus splitting their relative powers. All of the above-mentioned functionalities in the power splitter 220 are done in a distributed manner. The power splitter 220 includes a guide material 221 having a first refractive index and perturbation segments 222 having a second refractive index. In this case, each of the perturbation segments 222 have a lower refractive index and a minimum pitch between the perturbation segments 222 is indicated by a pitch d in the figure which determines a local effective index.

The first refractive index is greater than the second refractive index and the perturbation segments 222 are arranged in the guide material 221 to cross the first beam. Further, the first and second out ports 230 and 240 are configured to transmit a portion of the first beam having the same mode. In this case, a width of the power splitter 220 is arranged to be greater than widths of the input and output ports 210, 230, and 240. The width of the first port 210 is chosen to support the $TE_0$ mode. The width of the out ports 230 and 240 are arranged to be equal to the width of the first port 210 in order to support the same $TE_0$ mode. The input and output ports 210, 230, 240, and the power splitter 220 are configure to have an identical thickness.

Further, when the splitting ratio is asymmetric the perturbation segments 222 are arranged to be asymmetric along a beam direction centerline 211 drawn from the input port 210 to the output ports 230 and 240.

According to some embodiments, the 1:1 power splitter 200 can be optimized on a 2.6×2.6 μm² silicon region, which is discretized into 20×20 perturbation segments 222 (square lattice) binary problem. Each perturbation segment 222 represents a fully etched hole with 45 nm radius at 130 nm lattice constant (or pitch) d, where "1" means a hole etched and "0" means no hole. The 1:1 power splitter 200 can be covered by $SiO_2$ top cladding. Cylindrical holes corresponding to the perturbation segments 222 are also filled with $SiO_2$.

It should be noted that some perturbation segments can be arranged apart more than the pitch d from a group of the perturbation segments 222, which are indicated as segments 222' in the figure.

The local refractive index profile can be numerically optimized. One of the methods is to use direct binary search (DBS), and another method is to use machine learning. In both methods, the local refractive index change, or a fixed-size hole, is described as binary problem. Alternatively, the changes can be described more in smaller granularity, i.e., continuous values of whole sizes, or continuous change in the shape.

FIG. 2B shows E field (electric field) distribution plot of the 1:1 power splitter 200. From the field distribution, it is seen that the input beam is split and then narrowed at the output ports 230 and 240. Distributed holes, which can be referred to as the perturbation segments 222, increase the phase velocity of the beam compared with Si region (guide material 221) without holes (perturbation segments 222)

since the average refractive index of the perturbation segments 222 is smaller than that of the guide material 221 (Si region).

FIG. 2C is the transmission and reflection of each port of the splitter 200 as a function of frequency, showing ~90% transmission efficiency with less than −20 dB reflection obtained over 100 nm bandwidth. Compared with a related art power splitters based on photonic crystals, FIG. 2C indicates that the splitter 200 works over a substantially broader bandwidth since the splitter 200 avoids the Bragg reflection zone as is observed in photonic crystals. The efficiency of the splitter 200 can potentially be improved by using a larger matrix, although larger footprint and higher computational effort will be required.

Further, some embodiments of the present disclosure are based on recognition that subwavelength devices can provide compact photonic devices without relying on the specific resonance condition. The optical field feels the local averages of small structures. The small structures can be referred to as perturbation segments or pixels. The condition for the subwavelength devices is expressed as $$d < \lambda/(2n_{eff}) \quad (1)$$

where d is the minimum pitch or distance between the perturbation segments, $n_{eff}$ is a highest effective index of a waveguide mode of the guide material, and $\lambda$ is a wavelength of the input signal. When a typical SOI (silicon on insulator) structure is used, $n_{eff}$ is around 2.85 around a wavelength of 1550 nm. So d should be determined to be less than 270 nm.

The advantage of using subwavelength structure is two-fold: firstly arbitrary refractive index distribution can be created from binary refractive index materials wherein the electric field feels the local average refractive index, and secondly due to smaller pitch than the Bragg condition described in Eg. (1), there is not resonance effect and broadband operation is attainable.

Figure 2D:
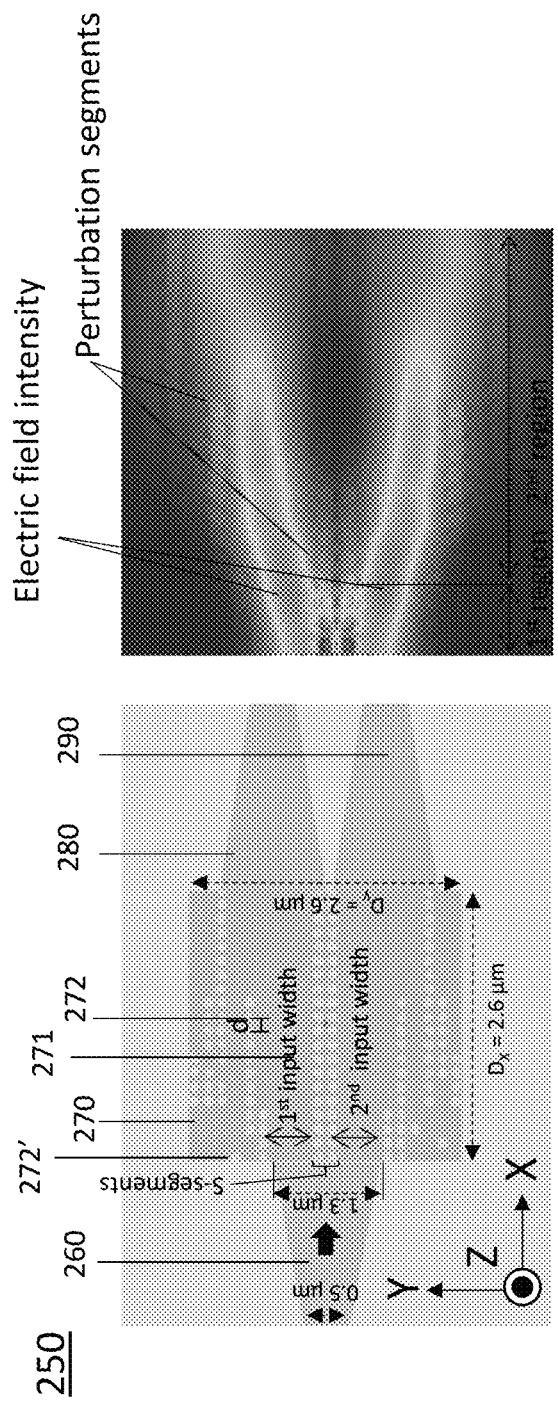
FIG. 2D shows a 1:1 power splitter, according to embodiments of the present disclosure with 12 holes positioned differently from FIG. 2A near the left hand side edges of the nanostructured power splitter far from the direct path from input to outputs.

FIG. 2D shows a top view of a 1:1 power splitter 250, according to embodiments of the present disclosure. This is another example illustrating geometry for a 1:1 power splitter. The 1:1 power splitter 250 includes an input port 260, a power splitter 270 and two output ports 280 and 290, which guide an output mode with an optical power equal to 1:1 ratio of the input power. The perturbation segments 272' (square lattice) are arranged in the format of 20×20 like in FIG. 2A. Here, the perturbation segments 272' are nearly identical to the perturbation segments in FIG. 2A, except for the upper left and lower left corners in the input side. It is not exactly symmetric to the center horizontal axis, but approximately symmetric.

Figure 2E:
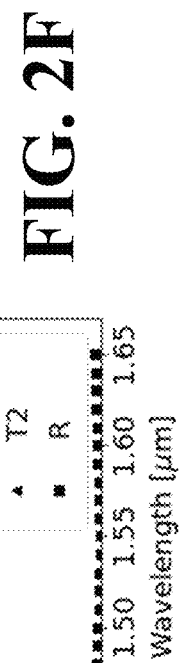
FIG. 2E shows a E field distribution plot of the 1:1 power splitter of FIG. 2D.

FIG. 2E shows E field (electric field) distribution plot of the 1:1 power splitter 250. From the field distribution, it is seen that the input beam is split and then narrowed like in FIG. 2B.

Figure 2F:
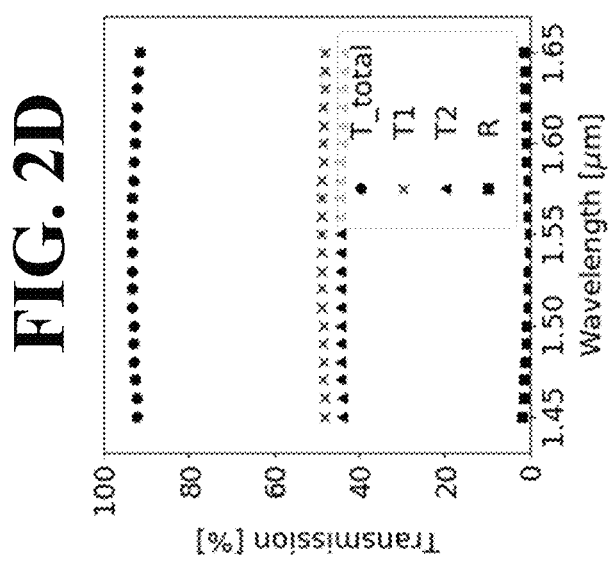
FIG. 2F is an FDTD spectrum indicating the efficiency of the 1:1 power splitter of FIG. 2D.

FIG. 2F is the transmission and reflection of each port of the splitter 250 as a function of frequency, showing ~90% transmission efficiency with less than −20 dB reflection obtained over 100 nm bandwidth. Compared with FIG. 2C, FIG. 2F indicates that the splitter 250 works as a 1:1 power splitter, nearly as good as those shown in FIG. 2C. This indicates that 1:1 splitter can be designed as long as the perturbation segment arrangement is approximately symmetric. In other words, there are multiple designs to achieve a certain desirable characteristics.

Further, a 1:2 power splitter can be designed with a similar procedure describe above. In this case, the two formed waveguide path look asymmetric.

FIG. 3A shows an example of a 1:2 power splitter 300 according to embodiments of the present disclosure. An example of a finalized geometry of the 1:2 splitter 300 after optimization is illustrated in the figure.

The 1:2 power splitter 300 includes an input port 310, a power splitter 320 and two output ports 330 and 340. The structure of the 1:2 power splitter 300 is similar to that of the 1:1 power splitter 200.

The power splitter 320 includes a guide material 321 having a first refractive index and perturbation segments 322. Each of the perturbation segments 322 has a second refractive index and a minimum pitch between the perturbation segments 322 is arranged to have a pitch d as indicated in the figure. It should be noted that some perturbation segments can be arranged apart more than the pitch d from a group of the perturbation segments 322, which are indicated as segments 322' in the figure. Note that because of the 1:2 power splitting ratio, the first input width is smaller than the second input width.

Further, when the first and second splitting ratios are respectively an m-th and an n-th represented by $T_m\%$ and $T_n\%$ and when m and n are equal numbers, the perturbation segments 321 are arranged to be asymmetrical along a beam direction centerline from the input port 310 to the middle of output ports 330 and 340.

For designing the 1:2 power splitter 300, a horizontally asymmetric 20×20 structure is being evaluated on a 2.6 μm×2.6 μm² square silicon region.

FIG. 3B shows a major E field distribution plot of the 1:2 power splitter 300, illustrating that the majority of input splits with a 1:2 ratio into two output routes in the first half of the splitter 320 and split beams are refocused and centered along the middle of each output waveguides in the second half.

FIG. 3C shows the transmission and reflection of finalized device indicating over 90% transmission efficiency with less than 1% reflection.

Figure 4A:
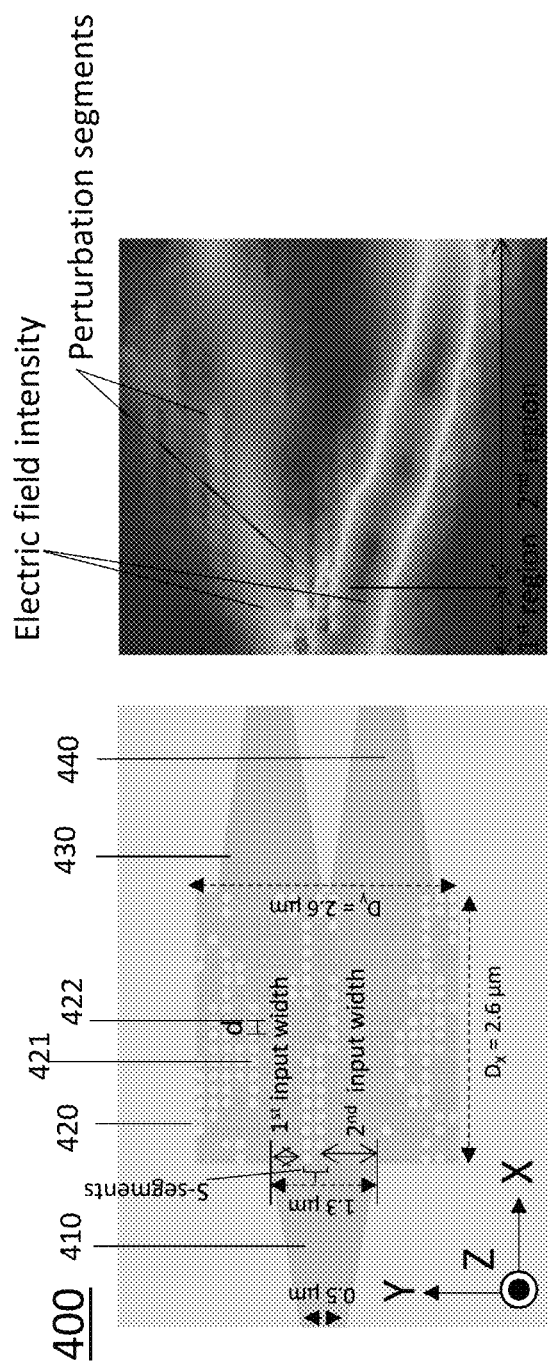
FIG. 4A shows a 1:3 power splitter, according to embodiments of the present disclosure.

FIG. 4A shows a 1:3 power splitter 400, according to embodiments of the present disclosure. The 1:3 power splitter 400 can be realized in a similar manner as shown in FIGS. 2A and 3A. As discussed above, in some cases, some perturbation segments can be arranged apart more than the pitch d from a group of the perturbation segments according to designing optimization of the power splitter. Note that because of the 1:3 power splitting ratio, the first input width is smaller than the second input width.

Figure 4B:
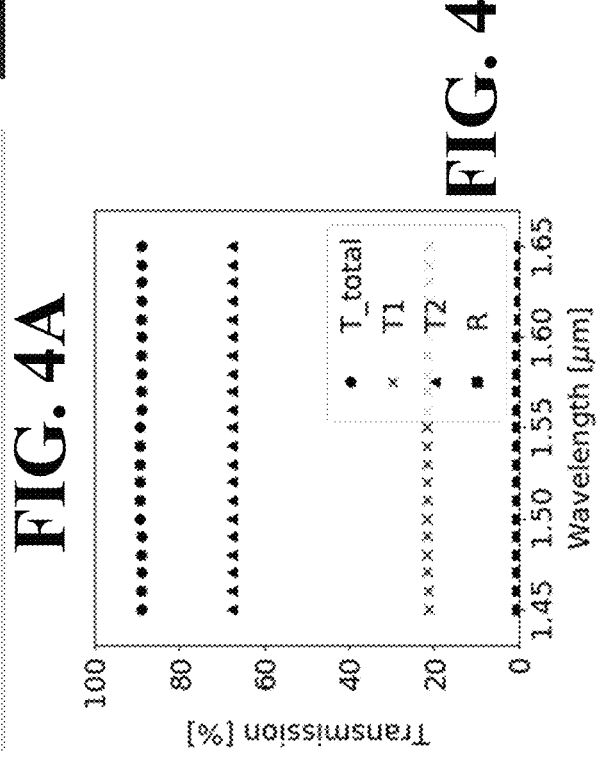
FIG. 4B shows a E field distribution plot of the 1:3 power splitter of FIG. 4A.

FIG. 4B shows a major E field distribution plot of the 1:3 power splitter 400, illustrating that the majority of input splits with a 1:3 ration into two output routes in the first half of the splitter 420 and split beams are refocused and centered along the middle of each output waveguides in the second half.

Figure 4C:
FIG. 4C is an FDTD spectrum indicating the efficiency of the 1:3 power splitter of FIG. 4A.

FIG. 4C shows that the optimized device can obtain 90% transmission efficiency with less than 1% back reflection.

Figure 5E:
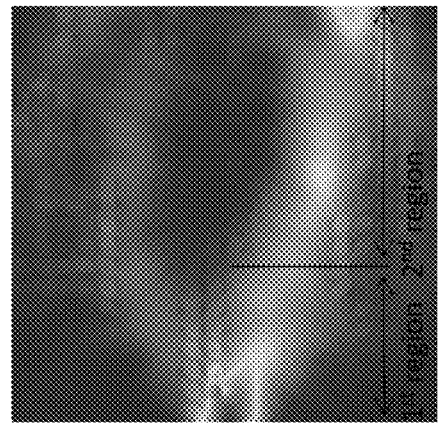
FIG. 5E shows a E field distribution plot of the 1:3 power splitter of FIG. 5D.
Figure 5D:
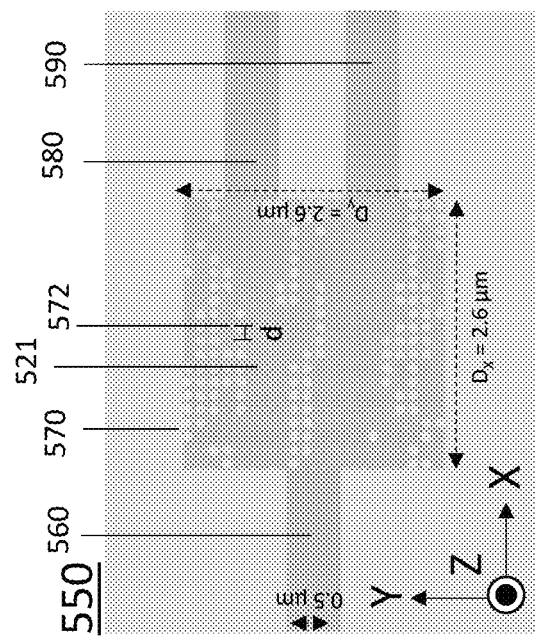
FIG. 5D shows a 1:3 power splitter, according to embodiments of the present disclosure with straight input and output ports that do not widen near the nanostructured power splitter.

FIG. 5A shows a schematic illustrating a 1:3 power splitter 500, according to embodiments of the present disclosure, in comparison with schematic of FIG. 5D showing the same power splitter without extended waveguide width at the input and output ports.

Figure 5F:
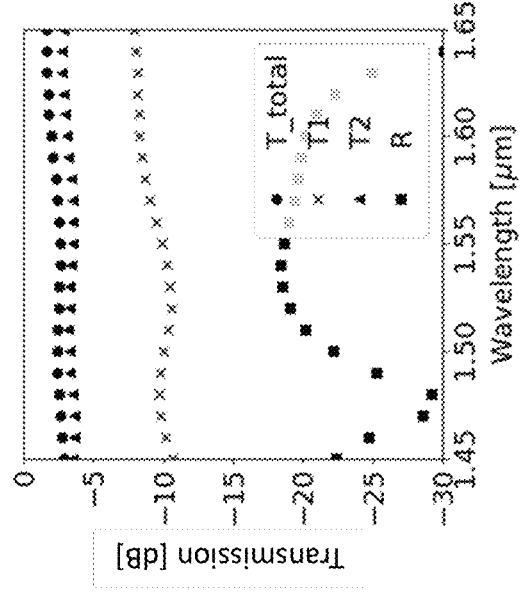
FIG. 5F is an FDTD spectrum in dB units indicating the efficiency of the 1:3 power splitter of FIG. 5D.

FIG. 5C shows simulated results that indicate that less than −25 dB back reflection over 100 nm bandwidth is obtained, in comparison with FIG. 5F showing higher back reflection and lower transmission efficiencies. This indicates that the widening the output ports thus reducing the width of the wall perpendicular to the output beam direction increases the transmission efficiencies and reduces the reflection.

In above examples, the input side of power splitter have perturbation segments that split the input beam into desired splitting ratios, while split beams are refocused, redirected parallel to the output port, and centered along the middle of each output waveguides in the output side of the power splitter, where more than 50% of the power is guided in the guide material 521.

FIG. 6A shows a schematic illustrating a 1:3 (power ratio) power splitter 600, according to embodiments of the present disclosure to investigate the extent of broadband spectral response of the power splitter.

FIG. 6B shows that the optimized device shows a constant broadband transmission efficiency of −0.46±0.05 dB in the 1.45-1.65 μm spectral range and a transmission efficiency of −0.97 dB in the wider 1.3-1.8 μm spectral range.

FIG. 6C(i), FIG. 6C(ii) and FIG. 6C(iii) show E(electric) field distribution plots of the 1:3 power splitter of FIG. 6A, at 1.3, 1.55, and 1.8 μm. It is seen that the light beams having wavelengths of 1.3 μm, 1.55 μm and 1.8 μm are properly distributed by the power splitter according to a pre-designed power ratio of 1:3 at the output ports. It is advantageous that a single photonic device can be used as a power splitter that enables to split input optical (light) beams with different wavelengths into a predetermined power ratio.

The above embodiments of the present invention have shown the advantage of separating the functionalities. The first region concentrates on splitting the input beam, making the targeted splitting ratio. The second region concentrates on reshaping the first and second beams such that their coupling into the output ports become efficient. Each region can be optimized to maximize their functionalities.

Furthermore, in accordance with other embodiments of the present invention, a novel photonic device for power splitters that can efficiently split the optical power of an input optical beam into multiple output beams according to a predetermined (pre-designed) power ratio at the output ports. In this case, the photonic device includes an input port configured to receive an input beam having an input power, a power splitter including perturbation segments arranged in a first region and a second region of a guide material having a first refractive index, each segment having a second refractive index, wherein the first region is configured to broaden the input beam and the second region is configured to split the broaden input beam into a first beam and a second beam, wherein the first refractive index is greater than the second refractive index; and output ports including first and second output ports connected the power splitter to respectively transmit the first and second beams. Some examples according to the concept above are described below.

Figures 7A, 7B, 7C:
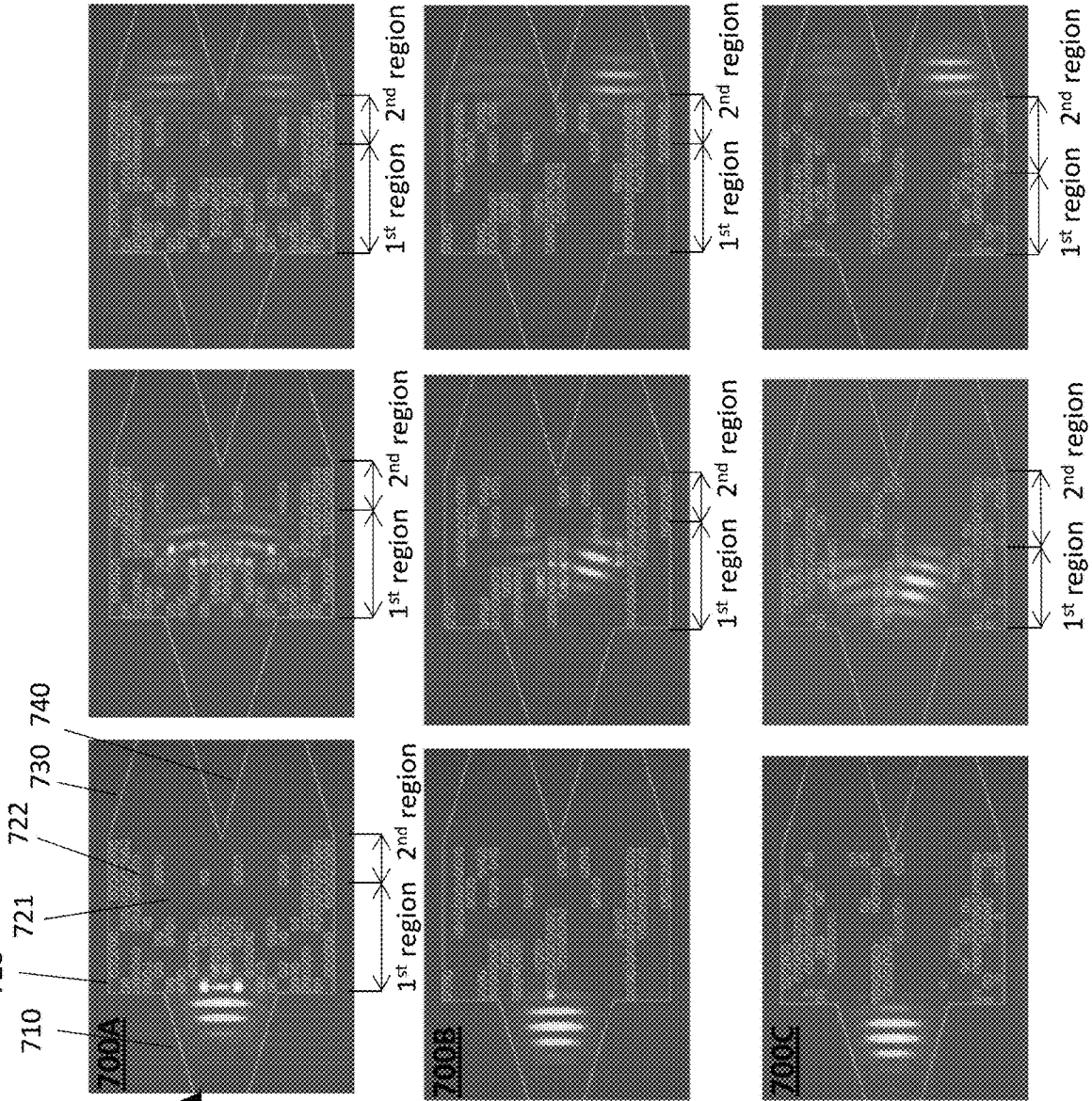
FIGS. 7A, 7B and 7C show light waves propagating from input ports to output ports via power splitters.

FIGS. 7A, 7B and 7C show light waves propagating through the photonic devices from the input ports to the output ports via the power splitters. FIG. 7A illustrates an example of a photonic device 700 according to the other embodiments. The photonic device 700 includes a power splitter 720 that includes perturbation segments 722 arranged in a first region and a second region of a guide material 721 having a first refractive index $n_1$, and each segment having a second refractive index $n_2$, wherein the first region is configured to broaden the input beam and the second region is configured to split the broaden input beam into a first beam and a second beam. Further, the photonic device 700 includes a first output port 730 and a second output port 740 to transmit the first and second beams, respectively. It should be noted that the perturbation segments in the first regions of the photonic devices in FIG. 7A functions to broaden the input beam before the second regions of the perturbation segments, and the broadened input beam is split into two output beams (first output beam and second output beam) in the second region of the perturbation segments and the split output beams are aligned to transmit through the first output port and second output port, respectively.

On the other hand, FIGS. 7B and 7C illustrate examples of photonic devices that have the power splitters that include perturbation segments arranged in a first region and a second region of a guide material having a first refractive index, each segment having a second refractive index, and the first region is configured to split the input beam into a first beam and a second beam, and the second region is configured to separately guide the first and second beams. It should be noted that the perturbation segments in the first regions of the photonic devices in FIGS. 7B and 7C function to split the input beams into two beams before the second regions of the perturbation segments.

FIG. 7A indicates the photonic device 700A having a 1:1 power splitter 720 that splits an input light into two light beams by a power ratio of 1:1. FIG. 7B indicates another photonic device 700B having a 1:2 power splitter that splits an input light into two light by a power ratio of 1:2. FIG. 7C indicates other photonic device 700C having a 1:3 power splitter that splits an input light into two light by a power ratio of 1:3.

Each of the photonic devices include an input port, a power splitter and output ports. The power splitter includes perturbation segments consisting of first refractive index material and second refractive index material (openings (holes) or different materials from that of surrounding area, e.g. silicon dioxide: $SiO_2$) indicated by circles in the figure. For instance, a first refractive index of the first refractive index material may be greater than that of the second refractive index material. Further, the input port, the materials of the output ports and the surrounding area of the circles can be an identical material.

Each of the power splitters includes at least two functioning regions, i.e. a first region and a second region. In FIG. 7A, the perturbation segments in the first region can play a role to broaden the input optical beam before passing the input beam to the second region of the power splitter.

In all cases, the input beam enters the power splitters (nanostructured power splitter) through the widen input waveguide port. After interacting with the perturbation segments at the first region of the power splitter, the splitting power ratio is determined; after propagating through the second region of the power splitter, the wave vectors of propagating beams are directed and aligned to the center of the corresponding output ports. In some cases, a ration of the lengths of the first and second regions may be between 50% and 65%. These ratios can provide a linearity of transmission for wavelengths from 1.45 μm to 1.65 μm. Such transmission characteristics are advantageous in practical use (industrial use).

Figure 8B:
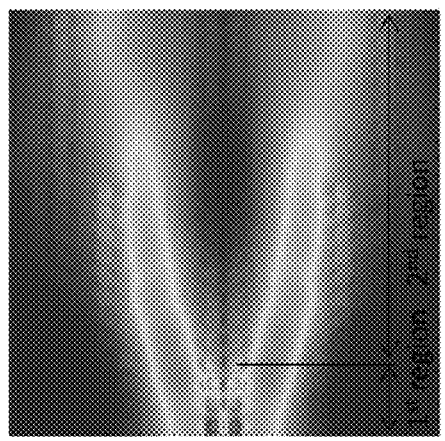
FIGS. 8A, 8B and 8C are other examples of photonic devices according to embodiments of the present disclosure.
Figure 8A:
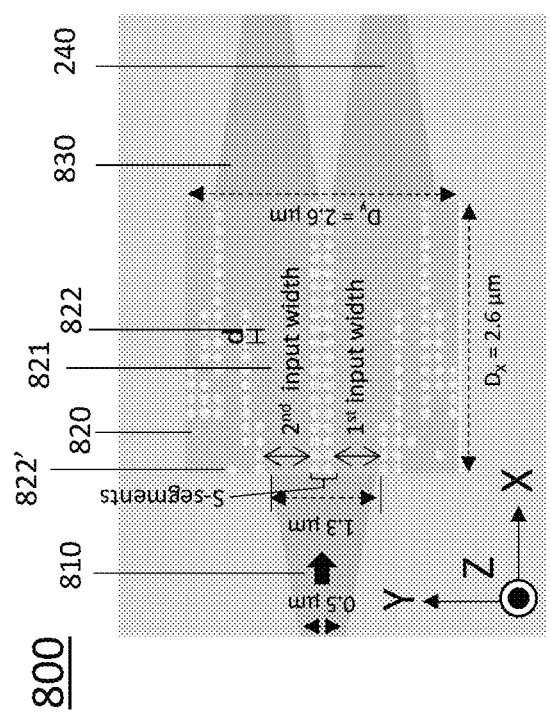
Figure 8C:
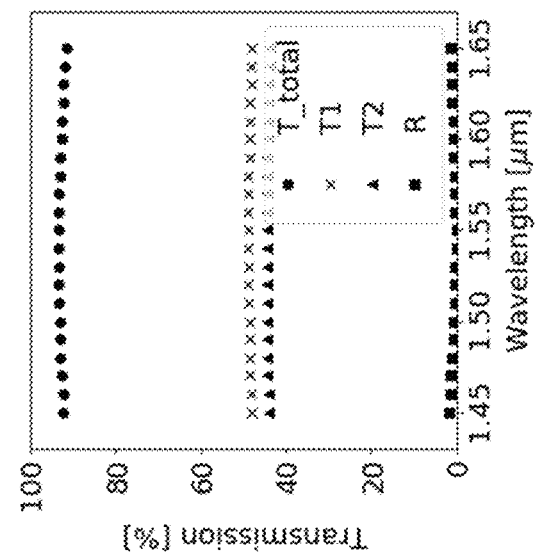
Figure 9B:
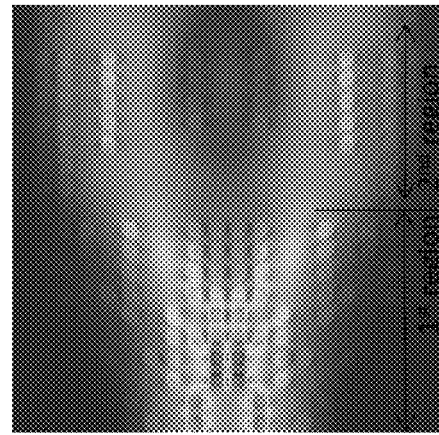
FIGS. 9A, 9B and 9C are other examples of photonic devices according to embodiments of the present disclosure.
Figure 9A:
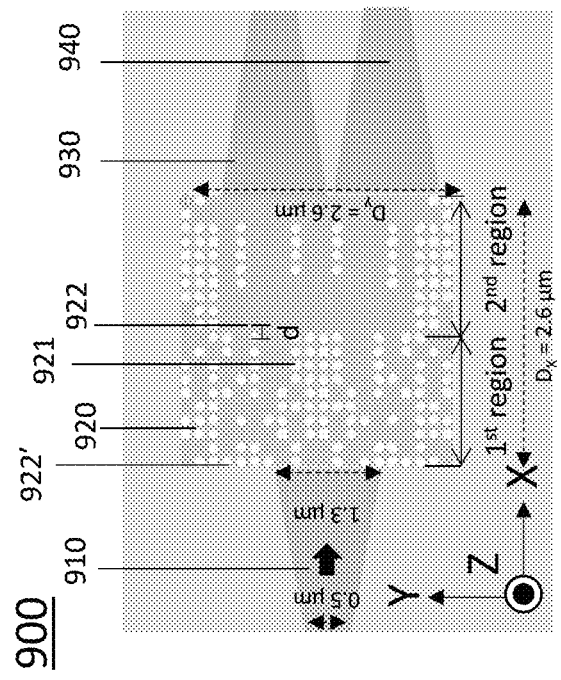
Figure 9C:
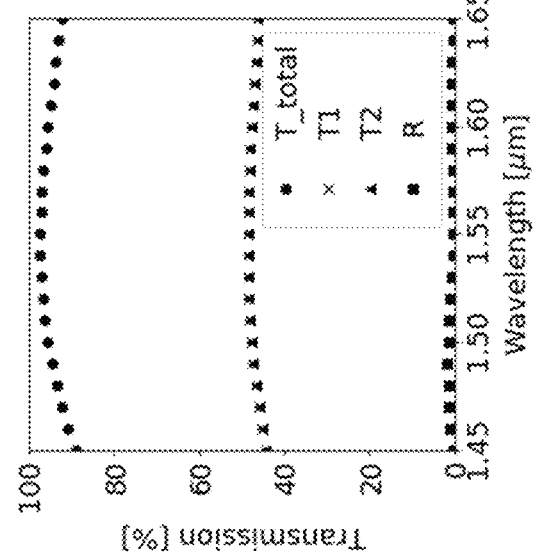

Further, the ultra-compact power splitter can also be cascaded with other devices to process any number of splitting routes and ratios. FIG. 8 shows an example of a 1 input to 8 output power splitter using 7 power splitters.

The input and output ports and the power splitter can be implemented in various material systems. The above examples used SOI. Alternatively, silicon nitride deposited on silicon dioxide may be used. Further, an indium gallium arsenide phosphide (InGaAsP) material layer grown on an indium phosphide (InP) substrate may also be used.

In some case, a width of the input port or each width of the output ports is wider than 0.5 μm to support a single mode propagation of the input beam throughout the photonic device.

Further, the photonic device can include one or more ports arranged on a side of the input or a side of the output ports, wherein widths of the all ports are identical.

For the photonic device, a back reflection from the first port is configured to be less than −20 dB. Further, the perturbation segments in the power splitter can be arranged to form waveguide-like paths of the first and second beams along propagation directions of the input beam.

The above-mentioned embodiments of the present invention described only TE modes. However, devices can also be designed for transverse magnetic (TM) modes.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. For example, because of the principle of reciprocity, if the splitter splits the optical power of the input to two arbitrary optical powers at port 2, and 3, then the device acts equally well for combining the optical powers from the port 2 and 3 to port 1.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A photonic device for splitting optical beams, comprising:
   an input port configured to receive an input beam having an input power;
   a power splitter including perturbation segments arranged in a first region and a second region of a guide material having a first refractive index, each segment having a second refractive index, wherein the first region is configured to split the input beam into a first beam and a second beam, wherein the second region is configured to separately guide the first and second beams, wherein the first refractive index is greater than the second refractive index, wherein the perturbation segments are arranged in subwavelength regime so as to avoid a Bragg reflection zone; and
   output ports including first and second output ports connected to the power splitter to respectively receive and transmit the first and second beams for instance, support can be found in the following paragraphs.

2. The photonic device of claim 1, wherein the output ports are formed from an output material, wherein the input port is formed from an input material, wherein widths of the first and second output ports are identical, wherein a width of the power splitter is greater than widths of the input port and the first and second output ports.

3. The photonic device of claim 2, wherein the input material, guide material and output material have an identical thickness.

4. The photonic device of claim 3, wherein the identical thickness is from 0.2 μm to 0.5 μm.

5. The photonic device of claim 2, wherein the input material, the output material and the guide material are an identical material.

6. The photonic device of claim 5, wherein the identical material is silicon.

7. The photonic device of claim 5, wherein the identical material is InGaAsP.

8. The photonic device of claim 2, wherein refractive indices of the input and output materials are identical to the first refractive index.

9. The photonic device of claim 1, wherein each of widths of the input and output ports is configured to widen toward the power splitter.

10. The photonic device of claim 1, further comprises top and bottom layers, wherein the top and bottom layers having a third refractive index are configured to sandwich the input port, the power splitter and the output ports, wherein the first refractive index is greater than the third refractive index.

11. The photonic device of claim 10, wherein the top and bottom layers are silicon dioxide layers.

12. The photonic device of claim 1, wherein each of the perturbation segments is formed by a hole in the guide material.

13. The photonic device of claim 1, wherein a minimum pitch d between the perturbation segments is arranged to satisfy a condition of $$d < \lambda/(2n_{\text{eff}})$$

wherein $n_{\text{eff}}$ is a highest effective index of a waveguide mode of the guide material, wherein λ, is a wavelength of the input beam.

14. The photonic device of claim 13, wherein the perturbation segments include at least one of the perturbation segments is arranged to separate from the other perturbation segments by a distance greater than the minimum pitch d.

15. The photonic device of claim 1, wherein when a power ratio of the first and second output powers is represented by T1:T2 and T1<T2, then a first input width corresponding to the first output port is arranged to be less than a second input width corresponding to the second output port.

16. A photonic device for splitting optical beams, comprising:
   an input port configured to receive an input beam having an input power;
   a power splitter including perturbation segments arranged in a first region and a second region of a guide material having a first refractive index, each segment having a second refractive index, wherein the first region is configured to broaden the input beam, wherein the second region is configured to split the broadended broaden input beam into a first beam and a second beam, wherein the first refractive index is greater than the second refractive index, wherein the perturbation segments are arranged in subwavelength regime so as to avoid a Bragg reflection zone; and
   output ports including first and second output ports connected to the power splitter to respectively transmit the first and second beams.

17. The photonic device of claim 16, wherein the output ports are formed from an output material, wherein the input port is formed from an input material, wherein widths of the first and second output ports are identical, wherein a width of the power splitter is greater than widths of the input port and the first and second output ports.

18. The photonic device of claim 17, wherein the input material, guide material and output material have an identical thickness.

19. The photonic device of claim 18, wherein the identical thickness is from 0.2 μm to 0.5 μm.

20. The photonic device of claim 16, wherein each of widths of the input and output ports is configured to widen toward the power splitter.

21. The photonic device of claim 16, wherein a minimum pitch d between the perturbation segments is arranged to satisfy a condition of $d < \lambda/(2n_{\mathit{eff}})$ wherein neff is a highest effective index of a waveguide mode of the guide material, wherein λ, is a wavelength of the input beam.

* * * * *